Patented Nov. 22, 1949

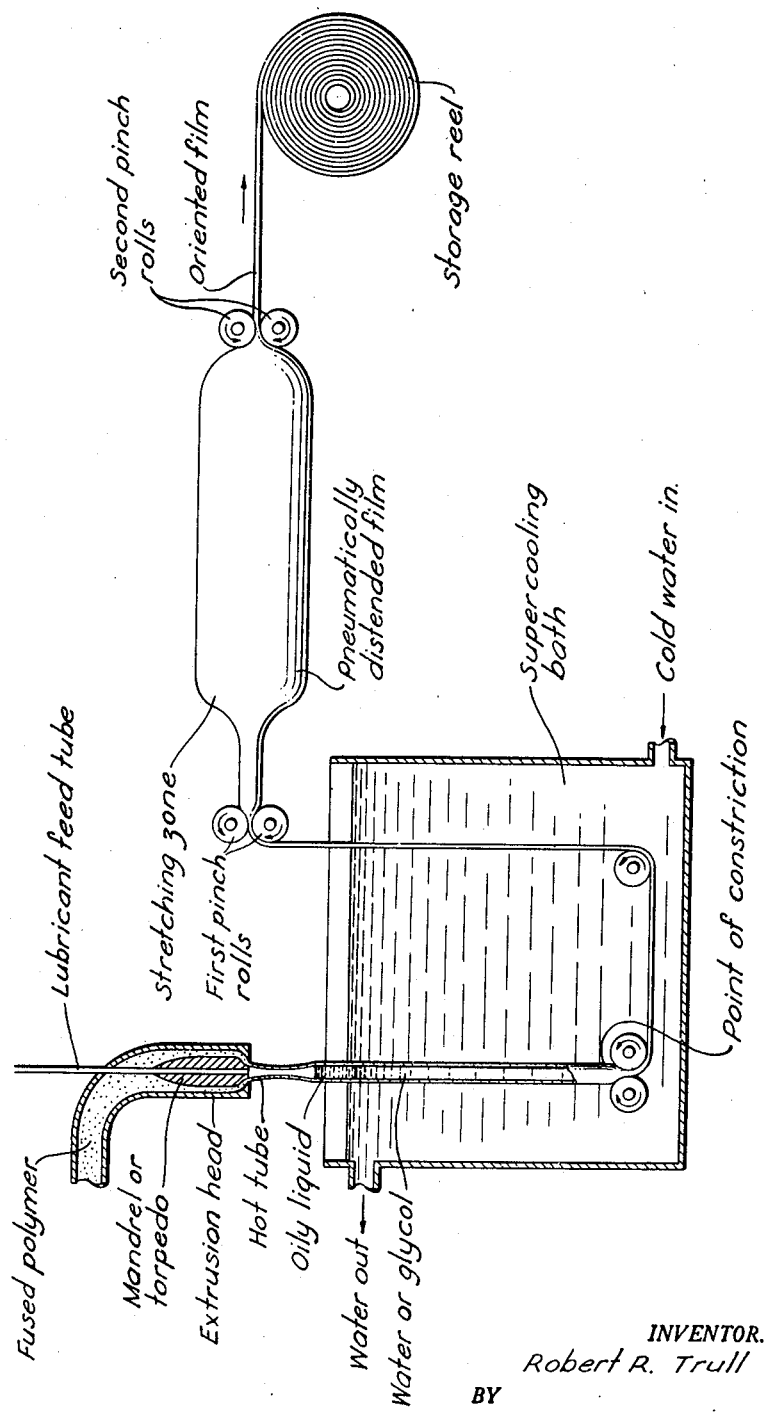

2,488,571

UNITED STATES PATENT OFFICE 2,488,571

PRODUCTION OF POLYMERIC VINYLIDENE CHLORIDE FILM

Robert R. Trull, Midland, Mich., assignor to The Dow Chemical Company, Midland, Mich., a corporation of Delaware Application December 11, 1947, Serial No. 791,139

5 Claims. (Cl. 18—47.5)

This invention relates to an improvement in the method and conditions used in the production of oriented film from crystalline polymeric vinylidene chloride. It is concerned primarily with a way in which the uniformity of such film may be improved.

The basic method for producing oriented articles from crystalline polymeric vinylidene chloride (which term is intended herein to include the crystalline copolymers of vinylidene chloride) is set forth by Wiley in U. S. Patents 2,183,602; 2,233,442; and 2,348,772, and involves fusion of the polymer to melt the submicroscopic crystallites, supercooling the temporarily non-crystalline polymer, and cold-working as by stretching, to effect recrystallization in the direction of the stretching force. The application of these principles to the production of film from such polymers has been outlined briefly by Wiley in U. S. Patent 2,409,521 and is described more fully by Stephenson in application Serial No. 721,738 filed January 13, 1947 (Patent No. 2,452,080) and in his earlier applications Serial No. 493,229 filed July 2, 1943, and Serial No. 394,061 filed May 19, 1941, both now abandoned.

The commercial method for making film from crystalline polymeric vinylidene chloride, described by Wiley and by Stephenson, of which the present invention is an improvement, comprises the continuous extrusion of a tube of fused normally crystalline polymer downwardly through an aqueous supercooling bath whose surface is near the extrusion orifice, maintaining a head of a lubricating liquid within the hot tube while it is being supercooled, flattening the tube between pinch rolls, a second set of which rotates from 2 to 4 times as fast as the first set, maintaining an air bubble in the tube between the two sets of rolls to distend it radially from 3 to 5 times its supercooled diameter and to stretch the tube two to four times longitudinally, the amount of entrapped air being adjusted so that the stretching occurs at a point in the path of travel of the tube intermediate between the two sets of pinch rolls, and finally collecting the so-formed thin-wall tube or slitting it to form a film. In the said process, the column of lubricating liquid is deemed necessary to prevent cohesion between the opposed internal walls of the tube after it is collapsed and is being advanced by pressure rollers. It is also useful in regulating the diameter and wall thickness of the hot, freshly extruded tube. Increase in the head of such liquid makes a tube of larger diameter with a smaller wall thickness, while a decrease in the head of lubricant causes the reverse effect. Mineral oil, or an oil composition, has been employed heretofore at this point in the operation, since such liquids do not have a high vapor pressure at the temperature of the freshly extruded plastic tube in which they are contained. Volatile materials have not been used, since their vapors tend to generate pressure within the hot tube, causing the tube to bulge and assume irregular dimensions, and often causing it to burst, with resulting loss in tube or film production until the column of lubricating liquid can be restored and a continuous imperforate tube can be threaded through the apparatus.

The use of a column of mineral oil as described has been deemed necessary and desirable, but has been found to cause one difficulty which has not been overcome heretofore. Owing to the low density of the oil, relative to that of the surrounding aqueous supercooling bath, the oil-filled portion of freshly extruded tube reacts instantly to any motion in the surrounding cooling medium, and, since the latter is kept in motion to maintain a constant temperature, the tube tends to oscillate about the line between the extrusion orifice and the submerged guide rolls. Such oscillation sets up a varying strain on the freshly extruded hot tube, and results in successive portions of the tube, measured along any line parallel to the tube axis, having a correspondingly varying thickness. After such non-uniform tube has been supercooled and recrystallized by bidirectional stretching the finished film exhibits the effect of such oscillation in its own dimensional irregularities.

It is the principal object of the present invention to provide improved conditions for carrying out the described film-forming operation such that the freshly extruded tube does not respond to the normal slight movement of the surrounding cooling liquid, and the creation of dimensional fluctuations is thereby avoided. A particular object is to provide a liquid column to replace the column of oil heretofore employed, which will lubricate the internal surfaces of the tube as required, but will not be subject to the above-noted disadvantage of the oil. A further object is to provide an improved substitute for the mineral oil heretofore employed in the process concerned, which will have a density substantially equal to that of the surrounding cooling water and will provide the required lubrication.

The foregoing and related objects have been attained, and a film of uniform thickness may now be produced from a crystalline vinylidene chloride polymer, by using a column of water or of ethylene or propylene glycol within the soft tube from the point of constriction of the supercooled tube to a level near the level of the surrounding cooling bath, and a column of mineral oil or other oily lubricant thereover having a constant depth, for each period of operation, usually in the range from 5 to 50 millimeters, and sufficient to bring the composite liquid column above the level of the cooling bath. When using a column of two immiscible liquids within the freshly extruded tube to lubricate the tube and regulate its dimensions, the hot plastic first comes into contact with the oily upper layer which is non-volatile at any temperature at which the polymer can be extruded safely. By the time the extruded tube has lost some of its heat to the atmosphere and more to the contained oil and the upper levels of the water bath, and moves further into the cooling bath, there is not enough residual heat to cause the water or glycol comprising the lower portion of the regulating liquid to boil. Due to the fact that the contained liquid is of substantially the same density, or is slightly (up to 1.15 times) heavier than the surrounding cooling water, the portion of tube which contains the two immiscible liquids, extending from near the extrusion orifice to a point of construction near the bottom of the cooling bath, withstands any normal movement of the external cooling liquid, and the objectionable oscillation previously noted, and its concomitant effects, are avoided.

The invention, as described, may be understood with reference to the accompanying drawing, the single figure of which is a partially diagrammatic and partially sectional elevation of the apparatus used in carrying out the invention, showing the extrusion and stretching of the tubular film.

In a typical example a plasticized crystalline copolymer of vinylidene chloride and vinyl chloride was extruded at its fusion temperature of about 173° C. through a tube-forming orifice having an outside diameter of 2.50 inches. The hot tube passed downwardly from the orifice into a cold water bath at 5° C. to supercool the copolymer, and was advanced through the bath by rollers, as shown. The section of tube above the first such rolls was filled with water to a level one-half inch below that of the water bath. A layer of white refined mineral oil was provided above the column of water in the tube, extending to a level one-half inch above that of the external water bath. After being conducted out of the supercooling bath, the supercooled tube was passed between a first pair of pinch rolls rotating at a peripheral speed of 9 feet per minute and subsequently between a second pair of pinch rolls rotating at a peripheral speed of 26 feet per minute. At the start of the operation, compressed air was introduced into the section of tube lying between the two sets of pinch rolls until a portion of that tube had a much greater diameter than the supercooled tube and until the introduction of additional air resulted only in the elongation of the distended bubble toward the first set of pinch rolls and not in any further increase in its diameter. The so-stretched tube was passed under tension over smoothing rolls (not shown) and was wound on a drum for storage. A section of the cold stretched tube was slit longitudinally and opened to form a film over 37 inches wide. The average thickness of the film was 0.00225 inch and the maximum variation from this thickness was about 0.0001 inch, or about a 10 per cent spread between extreme thicknesses as compared with the mean. During the production of the film the cold water in the supercooling bath was kept in constant circulation through a cooler (not shown) to maintain a constant temperature. This did not cause the liquid-filled portion of soft tube to oscillate, and the freedom from such oscillation is believed responsible for the uniformity of the film obtained. The water in the tube did not boil, and no bulging of the tube due to internal steam pressure was observed. The internal surfaces of the tube were well lubricated by the layer of mineral oil in the tube, as there was no tendency for the soft supercooled tube to seal itself shut when collapsed by the takeaway rolls in the cooling bath. The oil was constantly replenished through the illustrated feed tube.

By way of contrast, when the same apparatus and the same production rates were used on the same composition but with a single liquid column of mineral oil alone, the oil-containing portion of the tube oscillated very noticeably and, as a result, the film produced had the same average thickness of 0.00225 inch but had variations from this value of 0.00025 inch in each direction, or about a 22 per cent spread between the extreme thickness as compared with the mean. When it was attempted to operate the process using water alone as the liquid in the portion of the tube between the orifice and the submerged takeaway rolls, it was found that the contained water soon became so hot that the soft tube was badly distorted and then burst, and that when this difficulty was temporarily overcome by introducing a fresh supply of cool water, the walls of the supercooled tube fused together, when the tube was collapsed, showing the lack of lubrication.

When the orifice and the rate of extrusion were adjusted to permit the formation of thinner film having an average thickness of 0.00125 inch, the extreme variation from this average when using a two-liquid column of oil on water in accordance with this invention was only about 0.0001 inch, or a spread of about 16 per cent between extreme thicknesses. When a column of oil alone was used in making the thinner film, the thickness varied from 0.0010 to 0.0015 inch, or 40 per cent as compared with the average value of 0.00125 inch.

The method of the invention has been employed satisfactorily not only with the described oil-water combination as the regulating and lubricating liquid, but also when using a column of ethylene glycol or propylene glycol with an immiscible upper layer of mineral oil or of another lubricating liquid, such as a non-drying vegetable oil. In each case the necessary lubricating function is performed by the upper or oily one of the immiscible liquids and the stabilization of the tube against oscillation due to motion of the cooling water is provided by the lower liquid having a density near or slightly greater than that of the external cooling liquid. Of the liquids other than water, propylene glycol is preferred for use as the lower layer of the composite column of immiscible liquids, as its density (1.04) is nearest that of water.

The invention is not limited to the formation of film from the particular copolymer disclosed in the example, but is used with similar advantageous effect in the production of film from any normally crystalline vinylidene chloride polymer.

I claim:

1. In a method for the production of film from a crystalline vinylidene chloride polymer, in which the crystalline polymer is fused, extruded in tubular form downwardly into a supercooling bath, constricted after being supercooled, and is stretched both radially and longitudinally to form an oriented crystalline film after emerging from the bath, the improvement which consists in maintaining in that portion of the freshly extruded tube before the first constriction a composite column of two immiscible liquids one standing above the other, the lower of which extends from the constriction to a point near and below the level of the surrounding cooling bath and has a density from 1 to 1.15 times that of the said surrounding liquid, and the upper of the immiscible liquids extends to above the cooling bath, has a depth of from 5 to 50 millimeters and is an oily lubricant to prevent cohesion of the tube walls when the tube is collapsed after supercooling, the said improvement resulting in the consistent production of a film tube of substantially uniform thickness.

2. The method as claimed in claim 1, wherein the supercooling bath is water and the lower layer of the composite liquid column is water.

3. The method as claimed in claim 1, wherein the supercooling bath is water and the lower layer of the composite liquid column is propylene glycol.

4. The method as claimed in claim 1, wherein the supercooling bath is water, the upper layer of the composite liquid column is a refined mineral oil and the lower layer is water.

5. The method as claimed in claim 1, wherein the supercooling bath is water, the upper layer of the composite liquid column is a refined mineral oil and the lower layer is propylene glycol.

ROBERT R. TRULL.

REFERENCES CITED

The following references are of record in the file of this patent:

UNITED STATES PATENTS

| Number | Name | Date |
|---|---|---|
| 2,271,932 | Atkinson | Feb. 3, 1942 |
| 2,409,521 | Wiley | Oct. 15, 1946 |